2,831,020
PROCESSES FOR PRODUCING ANHYDROUS AROMATIC SULFONIC ACIDS WITH LOW SULFONE CONTENT AND THE PRODUCTS THEREOF

Samuel L. Norwood and Thomas W. Sauls, College Park, Ga., assignors to Tennessee Corporation, New York, N. Y., a corporation of New York No Drawing. Application September 3, 1954
Serial No. 454,201

2 Claims. (Cl. 260—505)

This invention relates to processes for the production of anhydrous aromatic sulfonic acids by sulfonation of aromatic hydrocarbons with sulfur trioxide in liquid sulfur dioxide, said acids being characterized by a low sulfone content and to the resulting products.

It is well known that aromatic hydrocarbons such as benzene, alkyl- and polyalkyl-benzenes, naphthalenes and the like react with sulfur trioxide in liquid sulfur dioxide to yield the corresponding sulfonic acids. The sulfonic acids so produced always contain substantial amounts of sulfones which contaminate the desired sulfonic acid and reduce the efficiency of the process by wasting reagents. Presumably, these sulfones are the result of the reaction between the sulfonic acid and unreacted hydrocarbon during the sulfonation process:

(1) $RSO_2OH + RH \rightarrow RSO_2R + H_2O$ where R is an aromatic nucleus, substituted or unsubstituted.

In column 2 of Table I, it can be noted that the sulfone content observed in the reaction product between sulfur trioxide and an aromatic hydrocarbon varies between 1.9 and 7%, depending upon the particular hydrocarbon being sulfonated. Presumably, the rate of sulfone formation according to reaction (1), above, is dependent partially upon the nature of the aromatic hydrocarbon being sulfonated.

We have now discovered that the sulfone content of aromatic sulfonic acids derived from reaction between an aromatic hydrocarbon and sulfur trioxide in liquid sulfur dioxide can be materially reduced by the incorporation of small amounts of organic carboxylic acids. In the sulfonation of aromatic hydrocarbons, these acids exert a profound influence on the reaction.

To demonstrate our invention, 1.05 mole of sulfur trioxide dissolved in six parts by weight of liquid sulfur dioxide are added to 1.0 mole of the aromatic hydrocarbon dissolved in two parts by weight of liquid sulfur dioxide, the latter mixture containing 1% by weight of a carboxylic acid based on the sulfonic acid to be formed. The reaction temperature is $-9°$ C. Upon completion of the sulfur trioxide addition, the product is freed of sulfur dioxide by evaporation of the latter and raising the temperature of the reaction product to 45–65° C. The reaction is kept at this temperature for approximately 15–30 minutes to expel residual sulfur dioxide. The sulfone content of the anhydrous aromatic sulfonic acids so prepared is obtained by the following procedure:

50 grams of anhydrous sulfonic acid dissolved in 200 ml. $H_2O$ is neutralized to pH 8 with 50% NaOH, cooled, and extracted with three 75 ml. portions diethyl ether. The combined ether extracts, after being washed with 50 ml. cool $H_2O$, are transferred to a tared flask for removal of ether and subsequent weighing of the sulfone. The flask and contents are brought to constant weight in an oven at a temperature exceeding the boiling point of the respective hydrocarbon and water before final weighing.

Using acetic acid as the carboxylic acid in the above described sulfonation procedure, the results recorded in Table I are obtained.

TABLE I
Effect of 1% glacial acetic acid on sulfone formation

| Hydrocarbon Used | Percent Sulfone in Product | |
|---|---|---|
|  | In presence of Acetic Acid | In absence of Acetic Acid |
| Benzene | 0.8–1.1 | 5 to 7 |
| Toluene | 0.1–0.7 | 1.9 to 2.5 |
| Ethyl Benzene | 0.4–0.5 | 1.9 to 2.2 |
| Xylene | 1.1–1.6 | 5 to 6 |

All percentages are based on the sulfonic acid or the combined weights of sulfur trioxide and hydrocarbon used in the synthesis.

Our invention can be carried out with a variety of carboxylic acids both aliphatic and aromatic, monobasic or polybasic. Table II shows the effect of different carboxylic acids when used in the above sulfonation procedure. The sulfone contents found in the absence of anyone of these carboxylic acids is to be found in column 2 of Table I.

TABLE II
Effect of 1% of different carboxylic acids on formation of ditolyl sulfone using 1.05 mole $SO_3$ per mole of toluene

| Carboxylic acid: | Percent sulfone in product |
|---|---|
| Acetic | 0.1 to 0.7 |
| Malonic | 0.8 |
| Azelaic | 0.6 |
| Benzoic | 0.6 |

The amount of sulfone formed is dependent upon the amount of carboxylic acid used in the sulfonation. Although 1% by weight of the sulfonic acid formed is the preferred amount, the effect is clearly present at lesser percentages as shown in Table III.

TABLE III
Effect of varying amounts of acetic acid on ditolyl sulfone formation using 1.05 mole $SO_3$ per mole of toluene

| Percent acetic acid: | Percent sulfone formed |
|---|---|
| None | 1.9 to 2.5 |
| 0.25 | 0.72 |
| 0.5 | 0.63 |
| 1.0 | 0.37 |

Percentages in excess of 1%, as for example 2%, show little advantage over 1% since the amount of sulfone is not drastically reduced further.

What is claimed is:

1. A process for the sulfonation of aromatic hydrocarbons to produce aromatic hydrocarbon sulfonic acids while inhibiting the formation of sulfones which comprises sulfonating an aromatic hydrocarbon with sulfur trioxide dissolved in liquid sulfur dioxide, while adding to the sulfonation reaction not more than 2% by weight based on the sulfonic acid to be formed of a carboxylic acid, selected from the group consisting of acetic acid, malonic acid, azelaic acid, and benzoic acid, the sulfonation being performed at atmospheric pressure and at a temperature of about $-9°$ C., and after the sulfonation reaction is completed increasing the temperature of the sulfonation mass to evaporate sulfur dioxide therefrom.

2. A process as defined in claim 1, said carboxylic acid being acetic acid.

References Cited in the file of this patent

UNITED STATES PATENTS 2,704,295 Gilbert et al. ---------- Mar. 15, 1955
2,706,736 Birch et al. ------------ Apr. 19, 1955